(12) United States Patent
Benteman

(10) Patent No.: US 10,161,106 B2
(45) Date of Patent: Dec. 25, 2018

(54) PLATFORM ASSEMBLY FOR A GROUND ENGAGING TOOL

(71) Applicant: CNH Industrial America LLC, New Holland, PA (US)

(72) Inventor: Jacob Benteman, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/392,320

(22) Filed: Dec. 28, 2016

(65) Prior Publication Data
US 2018/0179731 A1 Jun. 28, 2018

(51) Int. Cl.
| | | |
|---|---|---|
| *B60R 3/00* | (2006.01) | |
| *E02F 9/08* | (2006.01) | |
| *E02F 3/36* | (2006.01) | |
| *E02F 3/34* | (2006.01) | |

(52) U.S. Cl.
CPC .............. *E02F 9/0833* (2013.01); *B60R 3/00* (2013.01); *E02F 3/3604* (2013.01); *E02F 3/3414* (2013.01)

(58) Field of Classification Search
CPC ......... E02F 9/0833; E02F 3/8152; E02F 5/32; B60R 3/00; B60R 3/02
See application file for complete search history.

(56) References Cited

U.S. PATENT DOCUMENTS

| | | | | |
|---|---|---|---|---|
| 1,490,758 A | * | 4/1924 | Benson ..................... | B60D 1/44 280/496 |
| 1,675,033 A | * | 6/1928 | Lefkovitz ................. | E05C 1/04 292/60 |
| 1,770,751 A | * | 7/1930 | Hall ......................... | E05C 1/04 292/332 |
| 3,116,797 A | * | 1/1964 | Launder ................. | A01B 13/08 172/484 |
| 3,394,765 A | * | 7/1968 | Davis ........................ | E02F 5/32 172/744 |
| 3,891,261 A | | 6/1975 | Finneman | |
| 3,986,503 A | * | 10/1976 | Le Guillon ............... | B60R 3/02 182/89 |
| 4,073,591 A | | 2/1978 | Heitzman et al. | |
| 4,081,035 A | * | 3/1978 | Bowen ...................... | E02F 5/32 172/484 |
| 4,626,163 A | * | 12/1986 | Link ...................... | E02F 9/0833 280/166 |

(Continued)

FOREIGN PATENT DOCUMENTS

| | | | | | |
|---|---|---|---|---|---|
| JP | 08092998 | A | * | 4/1996 | ............ E02F 9/0833 |
| JP | 2000168452 | A | * | 6/2000 | ................ E02F 9/00 |
| KR | 20110046856 | A | * | 5/2011 | ............ E02F 9/0833 |

*Primary Examiner* — James A Shriver, II
*Assistant Examiner* — Steve Clemmons
(74) *Attorney, Agent, or Firm* — Peter K. Zacharias; Patrick M. Sheldrake

(57) ABSTRACT

A platform assembly for a ground engaging tool contains a platform that establishes a single substantially planar support surface, at least one pivot joint that is coupled to the platform to facilitate its rotation between a lowered and raised position and that is coupled to the ground engaging tool. The platform supports an object above the ground engaging components of the ground engaging tool while the platform is in the lowered position, and the platform facilitates access to the ground engagement components of the ground engaging tool while the platform is in the raised position.

19 Claims, 6 Drawing Sheets

(56) References Cited

U.S. PATENT DOCUMENTS

| | | | | |
|---|---|---|---|---|
| 4,679,810 A * | 7/1987 | Kimball | B60D 1/00 | 182/127 |
| 4,997,218 A * | 3/1991 | Culling | E05B 63/125 | 292/302 |
| 5,064,338 A * | 11/1991 | Lawrence | A01B 59/06 | 180/53.7 |
| 5,106,256 A * | 4/1992 | Murakami | E02F 3/325 | 172/434 |
| 6,079,938 A * | 6/2000 | Anderson | E02F 3/3414 | 414/685 |
| 7,237,636 B2 | 7/2007 | Ruppert et al. | | |
| 7,980,569 B2 * | 7/2011 | Azure | B62D 51/02 | 172/257 |
| 8,079,605 B2 * | 12/2011 | Kallevig | B62B 5/08 | 280/288.4 |
| 8,528,965 B2 | 9/2013 | Nagami et al. | | |
| 8,752,643 B2 * | 6/2014 | Shekleton | E02F 3/627 | 172/677 |
| 8,950,774 B2 * | 2/2015 | Ushikubo | B60R 3/02 | 280/415.1 |
| 9,169,622 B2 * | 10/2015 | Sho | E02F 9/18 | |
| 9,181,678 B2 * | 11/2015 | Yui | E02F 3/964 | |
| 9,387,805 B2 | 7/2016 | Helmuth et al. | | |
| 9,561,826 B2 * | 2/2017 | Kim | E02F 3/325 | |
| 2003/0051931 A1 * | 3/2003 | Johansson | B60R 3/02 | 180/69.2 |
| 2003/0066664 A1 * | 4/2003 | Matthews | E02F 5/32 | 172/699 |
| 2006/0290080 A1 * | 12/2006 | Vachal | B62D 51/008 | 280/32.7 |
| 2009/0050340 A1 * | 2/2009 | McIntyre | A01B 59/06 | 172/182 |
| 2014/0093304 A1 * | 4/2014 | Muraoka | B60R 3/02 | 403/116 |
| 2016/0001707 A1 * | 1/2016 | Madera | E02F 9/0833 | 182/223 |

* cited by examiner

PLATFORM ASSEMBLY FOR A GROUND ENGAGING TOOL

BACKGROUND

The present disclosure relates generally to a platform assembly for a ground engaging tool.

Certain work vehicles (e.g., tractors, harvesters, skid steers, etc.) may be used to tow or support tools configured to plow a field, till land, excavate soil, or accomplish other ground-working operations. For example, a ripper may be attached to the rear of a work vehicle to till soil. Furthermore, accessing an interior of the chassis of the work vehicle may facilitate servicing the work vehicle. However, the tools may interfere with accessing the interior of the chassis.

BRIEF DESCRIPTION

In one embodiment, a platform assembly for a ground engaging tool contains a platform that establishes a single substantially planar support surface, at least one pivot joint that is coupled to the platform to facilitate its rotation between a lowered and raised position and that is coupled to the ground engaging tool. The platform supports an object above the ground engaging components of the ground engaging tool while the platform is in the lowered position, and the platform facilitates access to the ground engagement components of the ground engaging tool while the platform is in the raised position.

In another embodiment, a platform assembly for a ground engaging tool, includes a plurality of platforms, where each of the plurality of platforms establishes a respective single substantially planar support surface. Furthermore, the platform assembly for a ground engaging tool contains a plurality of pivot joints, where at least one pivot joint of the plurality of pivot joints is coupled to a respective platform of the plurality of platforms and configured to couple to the ground engaging tool. At least one pivot joint is configured to facilitate rotation of the respective platform between a lowered position and a raised position, where each platform of the plurality of platforms supports at least one respective object above ground engaging components of the ground engaging tool while the platform is in the lowered position, and the platform facilitates access to the ground engagement components of the ground engaging tool while the platform is in the raised position.

In a further embodiment, a platform assembly for a ground engaging tool includes a platform formed from a plurality of support members collectively having a plurality of protrusions, where the heights of the plurality of protrusions relative to a base plane of the platform are substantially equal to one another. Furthermore, the platform assembly for a ground engaging tool, includes at least one pivot joint that couples the platform to the ground engaging tool, where the at least one pivot joint facilitates rotation of the platform between a lowered position and a raised position. Moreover, the platform supports an object above ground engaging components of the ground engaging tool while the platform is in the lowered position, and the platform facilitates access to the ground engagement components of the ground engaging tool while the platform is in the raised position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
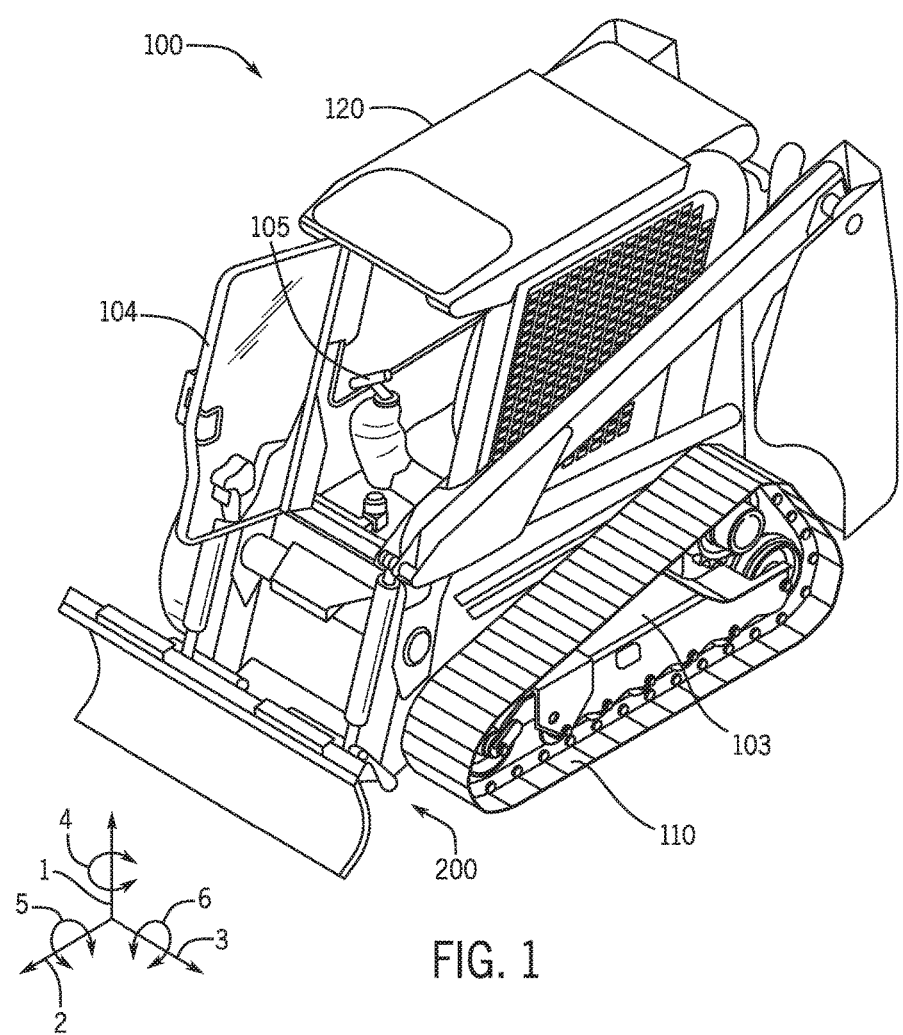
FIG. 1 is a perspective view of an embodiment of a work vehicle that may support a ground engaging tool.

Turning to the drawings, FIG. 1 is a perspective view of an embodiment of a work vehicle that may support a ground engaging tool. In the illustrated embodiment, the work vehicle 100 is a skid steer. However, it should be appreciated that the platform assembly disclosed herein may be utilized on other work vehicles, such as but not limited to on-road trucks, tractors, harvesters, and construction equipment. In the illustrated embodiment, the work vehicle 100 includes a cab 120 and a chassis 103. In certain embodiments, the chassis 103 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. In addition, the chassis 103 is configured to support the cab 120 and track assembly 110. The track assembly 110 may rotate to advance and direct the forward linear movement of the work vehicle 100. The track assembly 110 may include gears driven by the motor and/or by component(s) of the hydraulic system (e.g., hydraulic motor(s), etc.) to rotate the tracks. While the illustrated work vehicle 100 includes track assembly 110, it should be appreciated that in alternative embodiments, the work vehicle may include wheels or a combination of wheels and tracks.

The cab 120 is configured to house an operator of the work vehicle 100. Accordingly, various controls, such as the illustrated hand controller 105, are positioned within the cab 120 to facilitate operator control of the work vehicle 100. For example, the controls may enable the operator to control rotational speed of the track assembly 110, thereby facilitating adjustment of the speed and/or the direction of the work vehicle 100. In the illustrated embodiment, the cab 120 also includes a door 104 to facilitate ingress and egress of the operator from the cab 120. In addition, the controls may facilitate operator control of a ground engaging tool 200. For example, the controls may enable the operator to control the position of the ground engaging tool 200. Furthermore, while the illustrated work vehicle 100 includes a teeth as the ground engaging tool 200, it should be appreciated that in alternative embodiments, the work vehicle may include an excavator assembly, a tilling assembly, or a gripper assembly, among other attachments.

The ground engaging tool 200 may rotate relative to the chassis 103 about a lateral axis 3 in pitch 6 via a pivotal connection. Furthermore, rotation of ground engaging tool 200 relative to the chassis 103 about the longitudinal axis 2 in roll 5 and/or about the vertical axis 1 in yaw 4 may be substantially blocked. The ground engaging tool 200 may be controlled by the operator of work vehicle 100 such as the hand controller 105. In addition, work vehicle 100 may contain a platform that may support a structure (i.e., an operator, farm equipment, etc.). In certain embodiments, the platform may contain the ground engaging tool 200. In further embodiments, the platform may serve additional functions, such as facilitating access to the ground engaging tool 200 and providing structural support to the frame of the work vehicle 100, among other functions.

Figure 2:
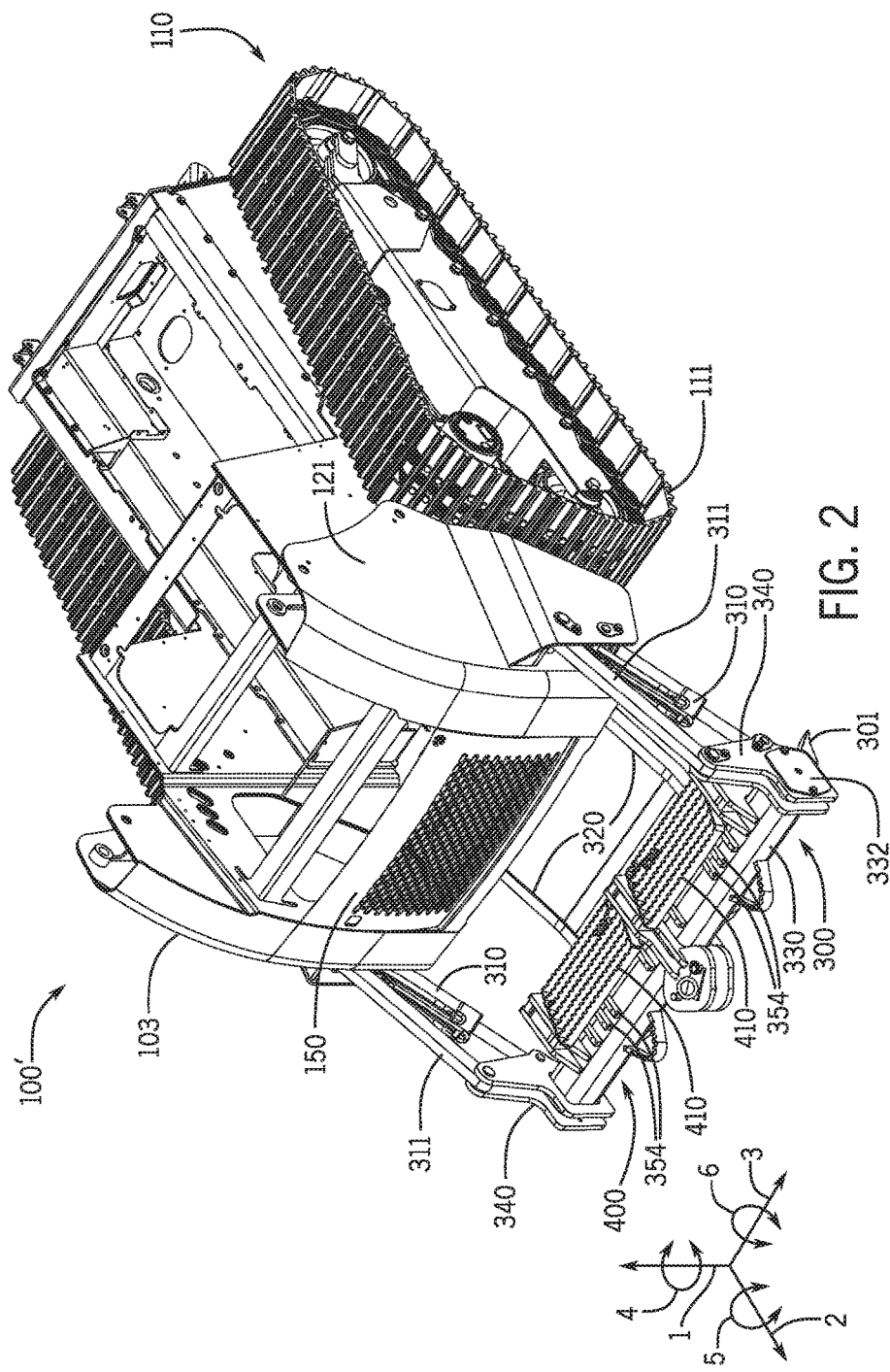
FIG. 2 is a perspective view of an embodiment of a portion of a work vehicle and an embodiment of a ground engaging tool coupled to the work vehicle.

FIG. 2 is a perspective view of an embodiment of a portion of a work vehicle 100' and an embodiment of a ground engaging tool 300 coupled to the work vehicle. In the illustrated embodiment, the ground engaging tool 300 is a ripper assembly. It should be appreciated that in further embodiments, the ground engaging tool may be a mower, a tiller, or a teeth, among other tools. Moreover, in the illustrated embodiment, the work vehicle 100' includes the ground engaging tool 300 and the track assembly 110, which is configured to advance and direct the work vehicle 100'. While the illustrated work vehicle 100' includes a track assembly 110 having two tracks 111 positioned on opposite lateral sides of the work vehicle, it should be appreciated that in alternative embodiments the work vehicle may include wheels or a combination thereof.

The ground engaging tool 300 include hydraulic cylinders 310 and support arms 311 that are rotatable coupled to the work vehicle 100' on the lateral side surfaces 121 to control movement of the ground engaging tool 300 along the vertical axis 1. It should be appreciated that in further embodiments, the ground engaging tool 300 may be attached to the work vehicle 100' via any suitable arm, shaft, or rail system, among various other attachment systems. Furthermore, the hydraulic cylinders 310 and the support arms 300 are pivotally coupled to edge plates 340 that are positioned on opposite lateral sides of the ground engaging tool 300. A beam member 330 is fixed at its two lateral sides to edge plates 340 by welding the edge plates 340 to the beam member 330, thereby coupling the edge plates 340 to the beam member 330. Furthermore, a flat plate 332 is fixed to the outside of the edge plates 340 (e.g., via two screws and washers). Extending and retracting the hydraulic cylinders 310 controls the heights of the beam member 330 relative to the soil surface. In the illustrated embodiment, additional arm 320 are rotatably coupled to the chassis 103 of the work vehicle 100' and to brackets 354. In additional embodiments, the ground engaging tool 300 may be coupled to the work vehicle 100' at more or fewer points. Because the ripper teeth(s) 301 are positioned relative to the entire ground engaging tool 300, it may be advantageous to have a method of gaining access to components to either service or remove ground engaging tool 300. In the illustrated embodiment, the ripper teeth(s) 301 are coupled to the beam member 330, which is formed from a square tube. Although a square tube forms the beam member 330 in the current embodiment, in additional embodiments, the beam member may be formed from solid or hollow members of other shapes, among various other members.

Furthermore, as discussed in detail below, the work vehicle 100' includes a platform assembly 400 having two platforms 410 configured to individually rotate about the lateral axis 3 in pitch 6, thereby enabling an operator to access the ripper teeth 301 (e.g., for removal and replacement, etc.). The platforms 410 provide a place for the operator to stand so the operator may open a door 150 to access serviceable components within the work vehicle 100'. In addition, the platform rotates to facilitate access to the ripper teeth 301.

Figure 3:
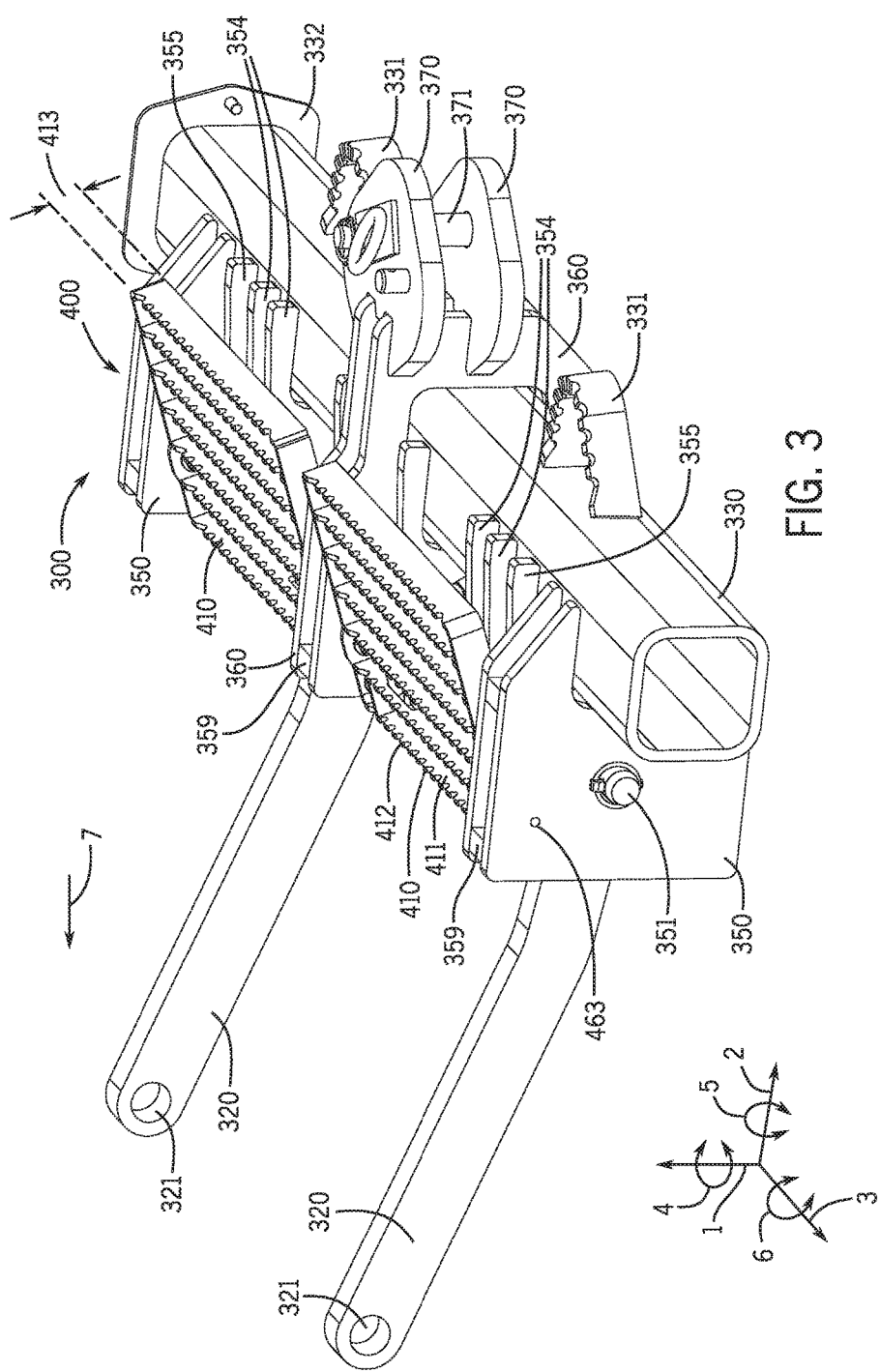
FIG. 3 is a perspective view of the ground engaging tool of FIG. 2, including a platform assembly.

FIG. 3 is a perspective view of the ground engaging tool 300 of FIG. 2 including the platform assembly 400. In the current embodiment, the beam member 330, which extends along the lateral axis 3, passes through two center brackets 360 that are positioned proximate the center of beam member 330 along the lateral axis 3. The two center brackets 360 are spaced apart with two spacers 359. The number and size of spacers may be altered in additional configurations. Furthermore, two flat plates 370 having one threaded or unthreaded opening, in which pin 371 passes there through, are coupled to the center brackets 360 (e.g., via welding, riveting, or brazing, etc.). In addition, two U-shaped metal members 331 are also coupled to the beam member 330 to provide foot holes for the operator to climb onto the platforms 410. At each of its two ends, the beam member 330 is fixed to the edge plates 340 (e.g., via welding, etc.), which are disposed on the inside of the square plate 332, as described in detail above. More specifically, FIG. 2 shows the edge plates 340, one set at each end of the beam member 330. Furthermore, the edge plates 340 may serve as attachment points for various accessories (e.g., hydraulic cylinders, arms, linkages, etc.)

Additionally, FIG. 3 illustrates two sets of C-brackets 350 are disposed on the beam member 330 laterally outward from the center bracket 360. Accordingly, each platform 410 is positioned between the center bracket 360 and a respective C-bracket 350. Each platform 410 has multiple supports 411 that extend in the lateral direction (e.g., along lateral axis 3) relative to a direction of travel 7 of the ground engaging tool 300. The longitudinal distance (e.g., along longitudinal axis 2) between the supports 411, the number of supports 411, the total size of the platform 410, the number of platforms 410, or a combination thereof, may vary in additional embodiments to accommodate different configurations of the ground engaging tool 300. For example, there may be other orientation of the supports 411 (e.g., the spacing between the supports 411 may not be even along the platform 410, the supports 411 may extend along the longitudinal axis 2 at an angle, etc.)

As illustrated, the supports 411 include multiple protrusions 412 extending along the vertical axis 1 that collectively form a planar support surface. The protrusions 412 all have equal heights 413 from the base plane of the respective platforms 410. The base plane is the plane formed by the protrusions facing the ground. It should be appreciated that in additional embodiments, the protrusions may be offset at any angle (e.g., 5 degrees, 15 degrees, 30 degrees, etc.) from the vertical axis 1. Furthermore, in additional embodiments, any suitable structure that forms a substantially planar surface could be used (e.g., a flat plate, a flat plate with ridges, etc.) instead of the protrusions 412.

Additionally, each set of C-brackets 350 is spaced apart with spacers 359 similar to the center brackets 360. A pin 351 extends through an opening in C-brackets 350 to couple a ripper teeth between the C-brackets 350 of each set. Similarly, a pin 351 extends through an opening in center brackets 360 to couple a ripper teeth between the center brackets 360 of each set. In additional embodiments, the ground engaging tool 300 may be assembled with more than two center brackets and/or more than two sets of C-brackets. The arms 320 are pivotally coupled to the underside of a work vehicle via the holes 321. Smaller C-brackets 355 and brackets 354 are disposed on the beam member 330 under the platforms 410 and between the sets of C-brackets 350 and the center bracket 360. As illustrated, two smaller C-brackets 355 and four brackets 354 are placed along the beam member 330 under each platform 410 to support the platform in a lowered position. It should be appreciated that, the platforms 410 could be supported by alternative members (e.g., the smaller C-brackets 355, the beam member 330, a plate, etc.). Furthermore, additional smaller C-brackets 355 and brackets 354 may be included in alternative embodiments of the ground engaging tool 300. As illustrated, the platforms 410 are angled upward relative to the smaller C-brackets 355. Each platform is configured to rotate about the lateral axis. Furthermore, as discussed in detail below each platform 410 is rotatable about a pivot joint 463.

Figure 4:
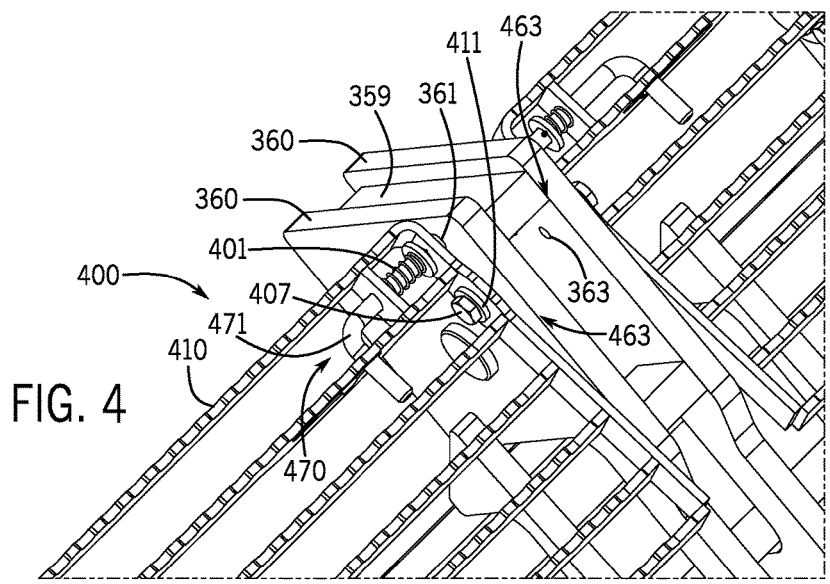
FIG. 4 is a perspective view of an embodiment of a locking mechanism and, a pivot joint that may be employed within the platform assembly of FIG. 3.

FIG. 4 is a perspective view of an embodiment of a locking mechanism and a pivot joint 463 that may be employed with the platform of assembly 400 of FIG. 3. As illustrated, the center brackets 360 are spaced apart by spacers 359. The center brackets 360 have openings 363 through which respective pivot screws 407 are inserted to establish the pivot joints 463, which facilitate the rotation of the platform 410 about the lateral axis 3 in pitch 6. Each pivot screw 407 passes through a respective opening and a washer 411 which is aligned with opening 363 on center bracket 360, thereby pivotally attaching the platform 410 to center bracket 360. A similar pivot joint is used to pivotally attach the opposite lateral end of the platform 410 to the C-bracket member. Each platform 410 is coupled to the center bracket and a respective C-bracket by respective pivot joints, thereby facilitating independent rotation of each of the platforms 410 relative to the ground engaging tool.

The platform 410 may be selectively locked in a lowered position, in which the platform is oriented substantially parallel to the ground and/or remain in a raised position, in which the platform is oriented at any angle (e.g., 15 degrees and 135 degrees) relative to a plane formed by the ground via a locking mechanism 470. In the illustrated embodiment, the locking mechanism 470 includes a pin 471 which selectively engages one or more holes, such as a first hole 361, in the center bracket 360. In the illustrated embodiments, a spring 401 urges the pin 471 towards each hole. By retracting the pin 471 along the lateral axis 3 away from the center bracket 360. The pin 471 disengages the hole, thereby facilitating rotation of the platform 410 about lateral axis 3 in pitch 6. In additional embodiments, there may be other biasing members (e.g., dampener, etc.) other than spring 401, and there may be other locking mechanisms (e.g., a latch, a screw, etc.) besides the pin and hole illustrated in the current embodiment. As such, there may be no springs and no pins in additional embodiments.

Figure 5:
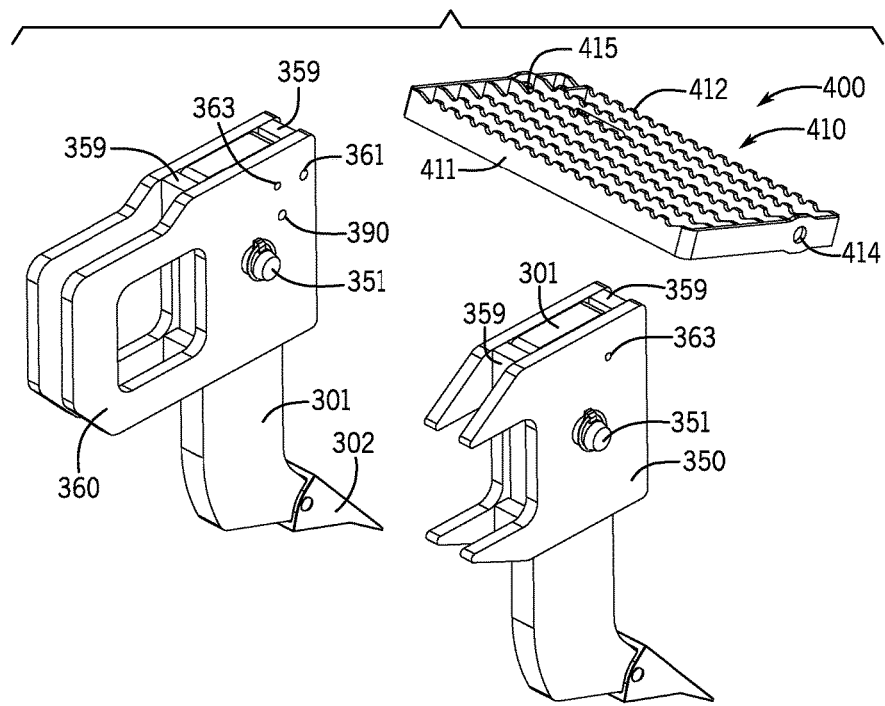
FIG. 5 is an exploded view of a portion of the platform assembly of FIG. 3.

FIG. 5 is an exploded view of a portion of the platform assembly 400 of FIG. 3. As explained in detail above, the platform 410 includes multiple supports 411 that extend along the lateral axis 3 relative to the direction of travel of the ground engaging tool. The supports 411 each include multiple protrusions 412 that collectively form a substantially planar support surface because the heights of the protrusions relative to the base plane are substantially equal.

The end of the platform 410 that is pivotally attached to C-bracket 350 has a hole 414 that is aligned with hole 363. The screw 407 is inserted through the holes to facilitate rotation of the platform about the lateral axis 3. The other side of the platform 410 also has a hole 415 that is aligned with hole 363 of center bracket 360, and then a screw 407 is inserted through both holes, thereby allowing the platform 410 to be pivotally attached to the center bracket 360 via the pin arrangement. Thus, the platform 410 is pivotally coupled to both a C-bracket 350 on one end and a center bracket 360 on the opposite lateral end. In addition, the ripper teeth are attached via pins 351 to center brackets 360. Center brackets 360 are welded to beam member 330, and the center brackets 360 are spaced apart from one another via two spacers 359. Furthermore, the C-brackets 350 are welded to the beam member 330, and the C-brackets 350 are spaced apart from one another via two spacers 359.

The space between the center brackets 360 and the space between the C-brackets house a top portion of ripper 301. In the illustrated embodiment, each ripper includes a removable teeth 302 position at a bottom of the ripper. The rippers 301 are each coupled to a respective set of brackets' portion via a pin 351, which passes through aligned holes of the ripper and the respective set of brackets.

Figure 6:
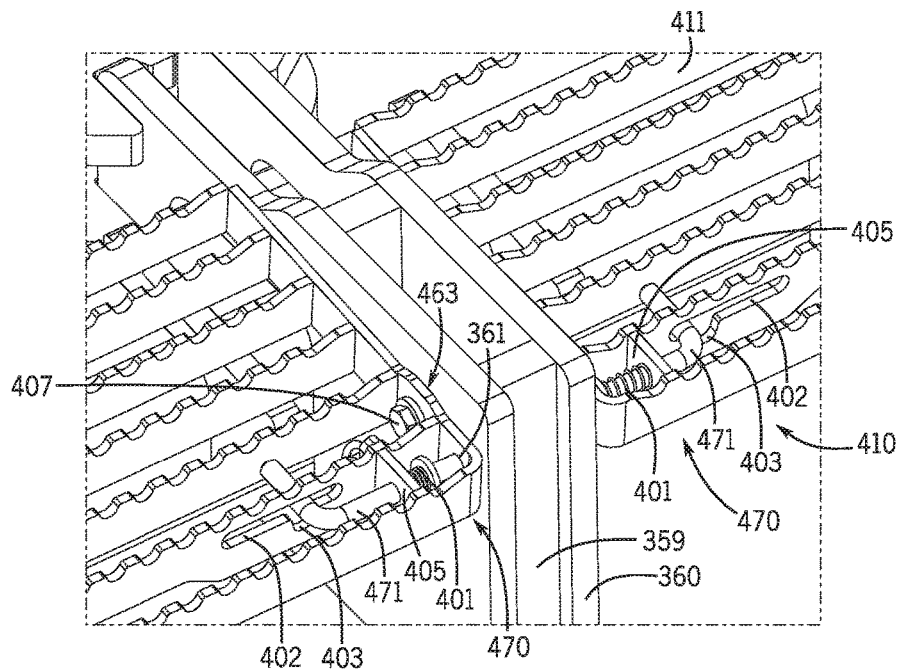
FIG. 6 is a perspective view of the platform assembly of FIG. 3 in a lowered position.

FIG. 6 is a perspective view of the platform assembly 400 of FIG. 3 in a lowered position. As illustrated, each platform 410 is locked from rotating about the lateral axis 3 in pitch 6 because the respective locking mechanism 470 is engaged. With the locking mechanism engaged the pin 471, the spring force applied by the spring 401, is engaged with a hole in the center bracket 360. The spring 401 is blocked from moving outwardly along the lateral axis 3 by a fixing plate 405, which has a hole large enough to facilitate passage of the lowered pin 471, while blocking the spring 401 from passing there through. The platform 410 is locked into the lowered position each substantially parallel to the ground.

Platform 410 is rotatable about the pivot joints 463 by manually retracting the pin 471 in a lateral direction opposite the center bracket 360 through the linear space 402 against the force of the spring 401. Once the pin 471 is extracted from the first hole 361, the pin cannot engage any other holes in center bracket 360. Furthermore, to lock the platform 410 into the illustrated lowered position, the platform 410 is rotated such that the pin 471 is aligned with the first hole 361 in center bracket 360, and the pin 471 is released such that the spring 401 drives the pin 471 into the first hole 361, thereby locking the platform 410 in the lowered position from rotating. While in the lowered position, the user may stand on the platform 410 to have access to the interior of the chassis of the work vehicle.

Figure 7:
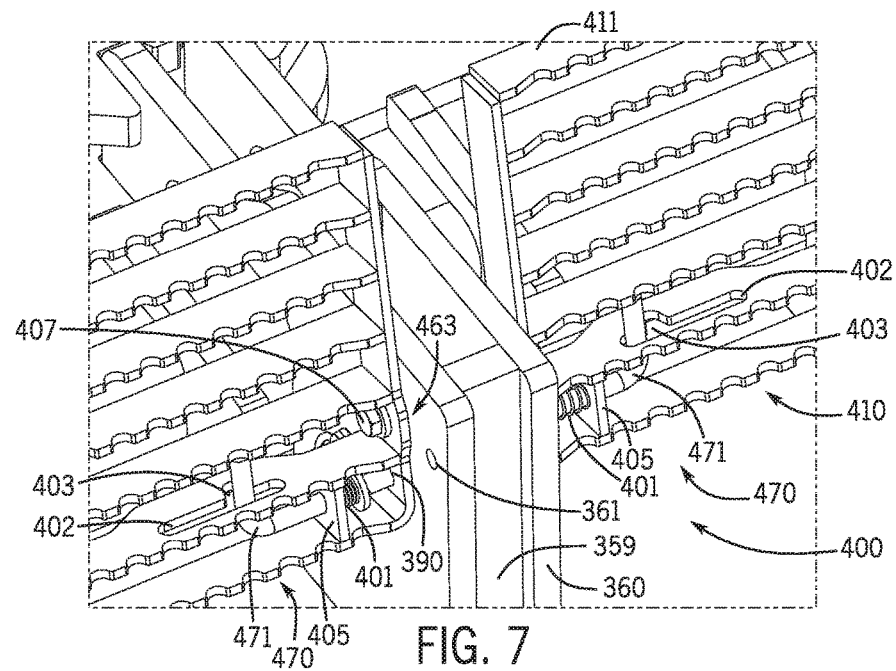
FIG. 7 is a perspective view of the platform assembly of FIG. 3 in a raised position.

FIG. 7 is a perspective view of the platform assembly of FIG. 3 in a raised position. Similar to the description regarding the functional details of the locking mechanism 470 found above, the pin 471 engages a second hole 390 in center bracket 360 (e.g., via the force applied the spring 401). As a result, the pin 471 engages the second hole 390, thereby blocking rotation of platform 410 and locking the platform in the raised position. While in the raised position, the platform 410 may allow the user to have access to the rippers of the ground engaging tool.

Although FIGS. 6 and 7 show both platforms 410 in the lowered position and in the raised position, it should be appreciated that because each platform assembly has a respective locking mechanism and a respective pivot joint for each platform is rotatable freely about the lateral axis independent platform. For example, one platform may be locked in the raised position, while the other platform is locked in the lowered position. While two platforms are used in the illustration, additional embodiments of the work vehicle could contain more or fewer platforms.

Figure 8:
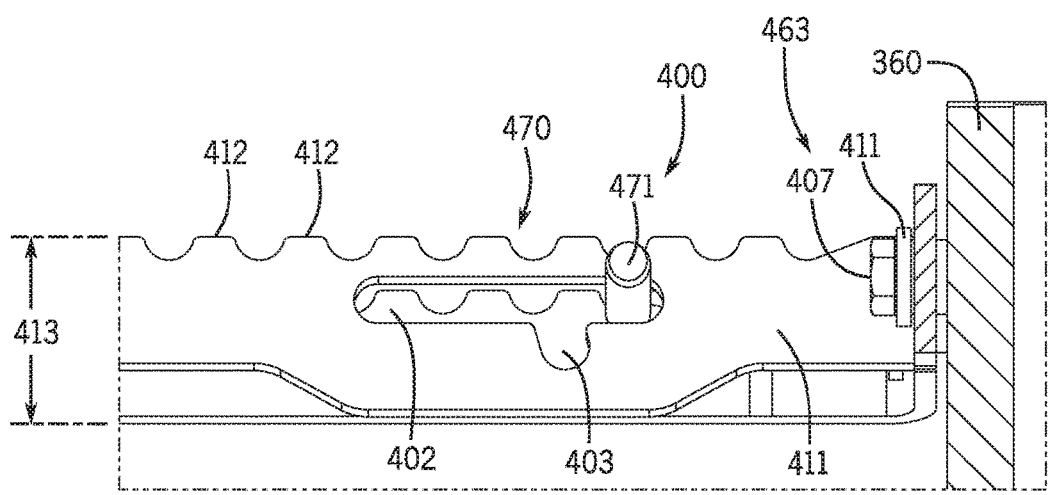
FIG. 8 is a sectional view of locking mechanism of FIG. 4.

FIG. 8 is a sectional view of the locking mechanism of FIG. 4. As illustrated, pivot joint 463, which includes the bolt 407 and the washer 411, couples the platform 410 to the center bracket 360.

The rotation of the platform is enabled when pin 471 is pulled away from center bracket 360 through the linear space 402 on one of the supports 411. Furthermore, the pin 471 may be rotated downwardly into the notch 403 located along the linear space 402 to block the pin 471 from engaging any opening in center bracket 360. In more detail, the supports 411 are made of many protrusions 412 aligned towards the vertical axis 1 that together form a planar support surface. The protrusions 412 all have equal heights 413 established from the base plane of the platform 410. The supports 411 each include multiple protrusions 412 that collectively form a substantially planar support surface because the heights of the protrusions relative to the base plane are substantially equal.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A ground engaging tool, comprising:
   a platform configured to establish a single substantially planar support surface;
   at least one pivot joint coupled to the platform, wherein the at least one pivot joint is configured to facilitate rotation of the platform between a lowered position and a raised position; and
   a beam member, wherein the beam member supports ground engaging components of the ground engaging tool, and the beam member is configured to block downward rotation of the platform while the platform is in the lowered position;
   wherein the platform is configured to support an object above the ground engaging components while the platform is in the lowered position, and the platform is configured to facilitate access to the ground engagement components while the platform is in the raised position.

2. The ground engaging tool of claim 1, wherein the at least one pivot joint comprises a first pivot joint positioned on a first lateral side of the platform and a second pivot joint positioned on a second lateral side of the platform, opposite the first lateral side.

3. The ground engaging tool of claim 1, wherein the platform comprises a plurality of supports spaced apart from one another.

4. The ground engaging tool of claim 3, wherein at least one of the plurality of supports extends in a lateral direction relative to a direction of travel of the ground engaging tool.

5. The ground engaging tool of claim 3, wherein at least one of the plurality of supports includes a plurality of protrusions that form the single substantially planar support surface.

6. The ground engaging tool of claim 1, comprising a locking mechanism configured to selectively block rotation of the platform while the platform is in the raised position, the lowered position, or a combination thereof.

7. The ground engaging tool of claim 6, wherein the locking mechanism comprises a pin configured to engage at least one opening in a frame of the ground engaging tool.

8. The ground engaging tool of claim 6, wherein the locking mechanism comprises a slot in the platform and a recess extending from the slot, wherein an end of the pin is rotatable into the recess to block the pin from engaging the at least one opening to enable the platform to rotate about the at least one pivot joint.

9. The ground engaging tool of claim 1, comprising a bracket positioned on the beam member, wherein the bracket is configured to support the platform on the beam member while the platform is in the lowered position.

10. A ground engaging tool, comprising:
    a plurality of platforms, wherein each of the plurality of platforms is configured to establish a respective single substantially planar support surface;
    a plurality of pivot joints, wherein at least one pivot joint of the plurality of pivot joints is coupled to a respective platform of the plurality of platforms, wherein the at least one pivot joint is configured to facilitate rotation of the respective platform between a lowered position and a raised position; and
    a beam member, wherein the beam member supports ground engaging components of the ground engaging tool, and the beam member is configured to block downward rotation of the respective platform while the respective platform is in the lowered position;
    wherein each platform of the plurality of platforms is configured to support at least one respective object above the ground engaging components while the platform is in the lowered position, and the platform is configured to facilitate access to the ground engagement components while the platform is in the raised position.

11. The ground engaging tool of claim 10, wherein the at least one pivot joint comprises a first pivot joint positioned on a first lateral side of the respective platform and a second pivot joint positioned on a second lateral side of the respective platform, opposite the first lateral side.

12. The ground engaging tool of claim 10, wherein at least one platform of the plurality of platforms comprises a plurality of supports spaced apart from one another.

13. The ground engaging tool of claim 12, wherein at least one of the plurality of supports extends in a lateral direction relative to a direction of travel of the ground engaging tool.

14. The ground engaging tool of claim 10, comprising at least one locking mechanism configured to selectively block rotation of at least one platform of the plurality of platforms while the at least one platform is in the raised position, the lowered position, or a combination thereof.

15. The ground engaging tool of claim 14, wherein the at least one locking mechanism comprises a pin configured to engage at least one opening in a frame of the ground engaging tool.

16. The ground engaging tool of claim 15, wherein the at least one locking mechanism comprises a spring configured to urge the pin into the at least one opening.

17. The ground engaging tool of claim 15, wherein the at least one locking mechanism comprises a slot in the at least one platform and a recess extending from the slot, wherein an end of the pin is rotatable into the recess to block the pin from engaging the at least one opening.

18. A ground engaging tool for a work vehicle, comprising:
    a platform formed from a plurality of support members collectively having a plurality of protrusions, wherein the heights of the plurality of protrusions relative to a base plane of the platform are substantially equal to one another;
    at least one pivot joint configured to facilitate rotation of the platform between a lowered position and a raised position; and
    a beam member, wherein the beam member supports ground engaging components of the ground engaging tool, and the beam member is configured to block downward rotation of the platform while the platform is in the lowered position;

wherein the platform is configured to support an object above the ground engaging components while the platform is in the lowered position, and the platform is configured to facilitate access to the ground engagement components of the while the platform is in the raised position.

19. The ground engaging tool of claim 18, wherein at least one of the plurality of support members extends in a lateral direction relative to a direction of travel of the work vehicle.

* * * * *